US006409082B1

(12) United States Patent
Davis et al.

(10) Patent No.: US 6,409,082 B1
(45) **Date of Patent: *Jun. 25, 2002**

(54) TRACKING OF PRODUCTS

(75) Inventors: Roelof Daniel Jacobus Davis; Frederick Jacobus Rabe, both of Gauteng (ZA)

(73) Assignee: Perseu Administration (Proprietary) Limited

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/463,526

(22) PCT Filed: Jul. 22, 1998

(86) PCT No.: PCT/US98/15058

§ 371 (c)(1),
(2), (4) Date: Feb. 11, 2000

(87) PCT Pub. No.: WO99/05627

PCT Pub. Date: Feb. 4, 1999

(30) Foreign Application Priority Data

Jul. 25, 1997 (ZA) ............................................. 97/6663

(51) Int. Cl.[7] ............................................... G06F 17/60
(52) U.S. Cl. ........................ 235/385; 235/375; 235/383
(58) Field of Search ................................ 235/375, 385, 235/381

(56) References Cited

U.S. PATENT DOCUMENTS

| | | | | | |
|---|---|---|---|---|---|
| 4,340,810 | A | | 7/1982 | Glass | 235/275 |
| 4,711,994 | A | * | 12/1987 | Greenberg | 235/384 |
| 5,038,283 | A | * | 8/1991 | Caveney | 364/403 |
| 5,401,944 | A | | 3/1995 | Bravman et al. | 235/275 |
| 5,434,394 | A | | 7/1995 | Roach et al. | 235/275 |
| 5,478,990 | A | | 12/1995 | Montanari | 235/275 |
| 5,801,628 | A | * | 9/1998 | Maloney | 235/375 |
| 5,870,711 | A | * | 2/1999 | Huffman | 235/385 |
| 5,963,134 | A | * | 10/1999 | Bowers et al. | 340/572.1 |
| 6,105,004 | A | * | 8/2000 | Halperin et al. | 235/383 |

* cited by examiner

*Primary Examiner*—Karl D. Frech
*Assistant Examiner*—Ahshik Kim
(74) *Attorney, Agent, or Firm*—Joseph H. Handelman; Ladas & Parry

(57) ABSTRACT

A method of detecting designated products from a number of sources includes the step of applying (12) a unique code to each one of a plurality of products at a first location (14). The method also includes determining which of the plurality of products become designated. The method further includes the steps of recording the codes of the designated products, reading (26) the codes of products distributed at a second location (16) and comparing (28) the read codes with the recorded codes to determine if any of the distributed products are designated products. The invention also includes a system for detecting designated products.

19 Claims, 1 Drawing Sheet

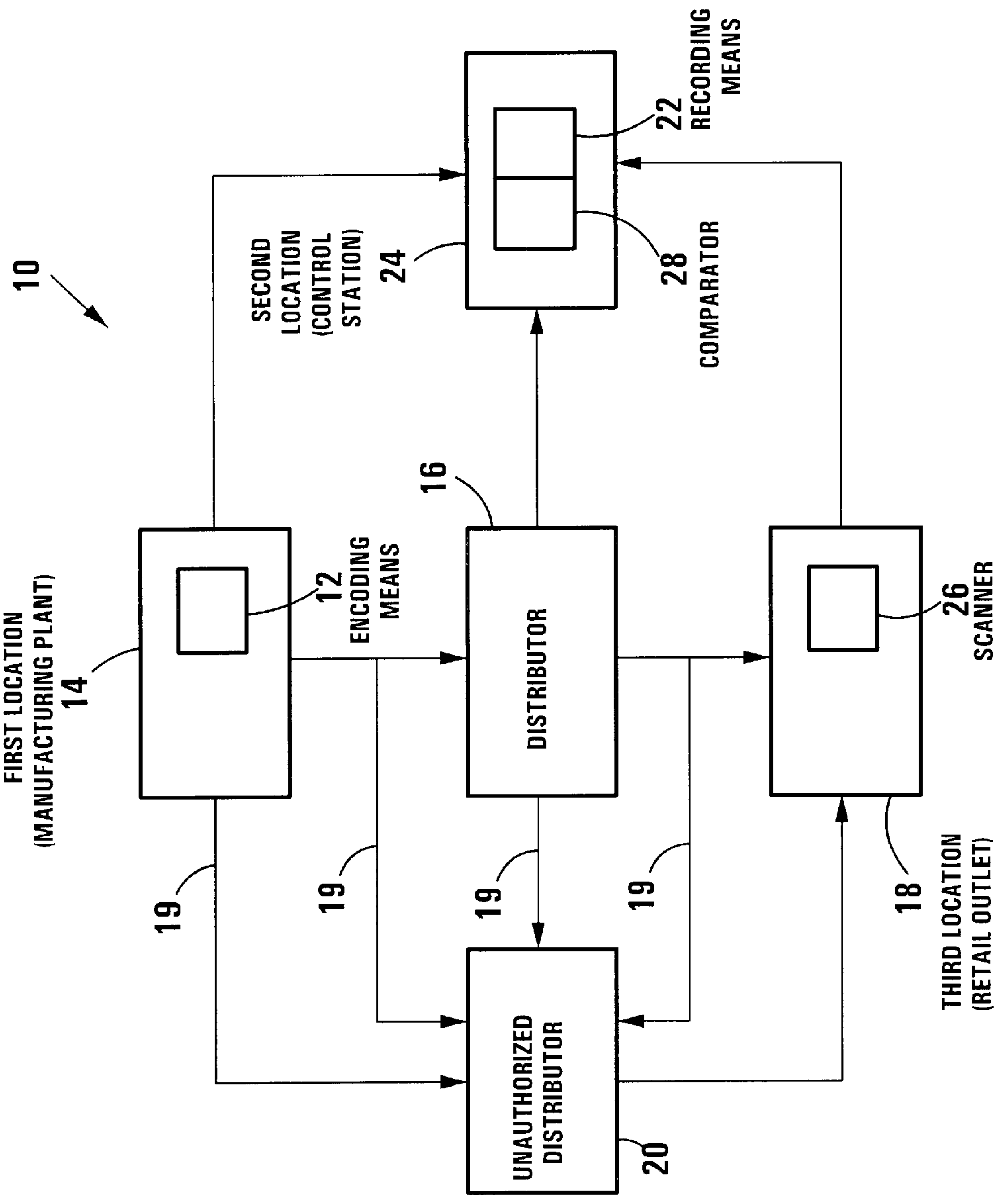
10
FIRST LOCATION (MANUFACTURING PLANT)
14
12
ENCODING MEANS
16
DISTRIBUTOR
SECOND LOCATION (CONTROL STATION)
24
22
RECORDING MEANS
28
COMPARATOR
26
SCANNER
18
THIRD LOCATION (RETAIL OUTLET)
19
19
19
19
UNAUTHORIZED DISTRIBUTOR
20

TRACKING OF PRODUCTS

THIS INVENTION relates to the tracking of products. More particularly, this invention relates to a method of detecting designated products and to a system for detecting designated products.

According to a first aspect of the invention, there is provided a method of detecting designated products from a number of sources, the method including the steps of applying an unique code to each one of a plurality of products at a first location;

determining which of the plurality of products become designated;

recording the codes of the designated products;

reading the codes of products distributed at a second location;

and comparing the read codes with the recorded codes to determine if any of the distributed products are designated products.

It will be appreciated that the term "designated products" includes products that are stolen, products that are lost by undetermined means and picked up as lost through stock taking or other methods of reconciling numbers of products, products not intended for re-sale to consumers, sample batches of products, defective products, products sold to a Government sector, export products, imported products, or the like. "Products" is also meant to include three-dimensional articles and other articles such as cheques, tickets or the like. Designated products which are detected may then be recovered. It will be appreciated that the method and system may also be used as an audit system for keeping track of designated products, in particular, for products not intended for re-sale.

The codes of the designated products may be determined by retaining a first list of the unique codes which are applied to the products at the first location, and comparing it to a second list of codes of products which are decoded at another authorised location, with the codes which appear on the first list and not the second list comprising the codes of the designated products.

The codes of the designated products may be recorded at a central loss control station. The method may include transmitting the read codes to the central loss control station, for comparing the read codes with the recorded codes.

The method may also include transmitting data on the identity of the second location and data on the time at which the read codes are transmitted to the central loss control station.

The method may include triggering an alarm at the central loss control station if designated products are detected to alert a person on duty. The data may also be visually displayed at the central loss control station in such a way that it alerts a person on duty.

A record of the data and the read codes may be retained at the central loss control station if the products are designated products.

According to a second aspect of the invention, there is provided a system for detecting designated products from a number of sources, the system including an encoding means for applying an unique code to each one of a plurality of products at a first location;

a designated products determining means for determining which of the plurality of products become designated;

a recording means for recording the codes of the designated products;

a reading means for reading the codes of products distributed at a second location; and a comparator for comparing the read codes with the recorded codes to determine if any of the distributed products are designated products.

The comparator may be located at a central loss control station. The codes of the designated products may be retained in a database of the comparator at the central loss control station.

The system may include a transmitting means for transmitting the read codes to the comparator at the central loss control station. The transmitting means may also transmit data on the second location to a central loss control station.

The first location may be a manufacturing plant, with the codes being applied to manufactured products on an assembly line. Alternatively, the first location may be a warehouse for imported products or for export products.

The second location may be a retail outlet, with the reading means forming part of a bar code scanning system. Alternatively, the second location may be a retail outlet, with the reading means being in the form of a free-standing or hand held scanner suitable for use by a till operator or an independent user of the system.

It is to be appreciated that the system is not limited to use with retail products or products earmarked for re-sale.

The invention is now described, by way of example, with reference to the accompanying drawing which shows a schematic flow chart representing a system, in accordance with the invention, for recovering designated products.

In the drawing, reference numeral 10 generally indicates a flow chart representing a system, in accordance with the invention, for recovering designated products.

The system includes an encoding means 12 for applying an unique forgery resistant code to each one of a plurality of manufactured products. The encoding means 12 is located in a manufacturing plant 14, with a code being applied to each product on an assembly line. The code may be in the form of a forge-resistant mark such as a hologram.

The manufactured products are transported from the plant 14 to the premises 16 of a distributor, who, in turn, supplies the products to an end retail outlet 18 where they are sold to the public.

It will be appreciated that the manufactured products can reach the end retail outlet 18 though different routes. Some of the manufactured products may be stolen or otherwise designated from the plant 14, from the premises 16 of the distributor, or at any stage when being transported from the plant 14 to the premises 16 or the retail outlet 18. The stolen or designated products land up with an unauthorised distributor at a venue 20 through any one of routes 19. The unauthorised distributor sells the products and they may also be distributed through the retail outlet 18.

The quantity of manufactured products is checked by the distributor when the products are received at the premises 16. If the quantity received does not tally with the quantity of manufactured products dispatched by the manufacturer, the distributor knows that some of the products have become designated products. The distributor receives a list of codes applied to the manufactured products and a decoding device from the manufacturer to determine the codes of the designated products. The quantity of manufactured products may also be checked at the retail outlet 18 in the same way or at any other stage, if theft is suspected.

A recording means 22 for recording the codes of designated products is located at a central loss control station 24. The codes of the designated products are supplied to the central loss control station 24 where they are entered into the recording means 22 which is in the form of a database.

A reading means in the form of a scanner 26 for reading the codes of distributed products is located at the retail outlet 18. The control station 24 includes a comparator 28 for comparing the read codes with the recorded codes to determine if the products are designated products. The read codes are transmitted to the station 24 on a daily or more regular basis.

In use, all of the distributed products located at the retail outlet 18 are scanned at point of sale or on the shelves. The comparator 28 at the station 24 compares the read codes with the recorded codes to determine if any of the distributed products are designated products which have been received by an unauthorised route or dealer. If it is determined that the distributed products are designated products, data is retained at the central loss control station 24. The data includes the codes of the detected designated products, the identity of the second location and the time of the reading. The data are visually displayed at the central loss control station in such a way that it alerts a person on duty. The person on duty will act on the information in an appropriate way, for example, by alerting the police. A record of the data is maintained at the central loss control station 24 for evidence purposes.

The inventors believe that the invention has several advantages. Firstly, a central database of designated products is established. Also, designated products are accurately marked by each having an individual code which can be identified in a simple operation. Further, accurate records of the process are available for possible criminal prosecution.

What is claimed:

1. A method of detecting designated products from a number of sources, the method including the steps of:

applying a unique code to each one of a plurality of products at a first location;

designating certain of the products;

compiling a list of codes of said designated products;

transmitting said list of codes of said designated products to a central loss control station at a second location;

recording said designated codes at the central loss control station;

reading the codes of a multiplicity of products at a third location;

transmitting said codes of said products at said third location to said central loss control station;

comparing said codes received from said third location with said codes recorded at the central loss control station; and triggering an alarm at the central loss control station if any of the codes of the products at said third location match the codes of the designated products.

2. The method as claimed in claim 1, in which products that are designated are from the group consisting of products that are samples, are not intended for resale, are intended for use by Government, and are intended for export.

3. The method as claimed in claim 1, in which a first list of codes of some of the products that are to be transported to a fourth location is complied at the first location, and designating those products that do not arrive at the fourth location.

4. The method as claimed in claim 1, in which said step of designating those products that do not arrive at the fourth location comprises compiling a second list of codes of those products that arrive at said fourth location and comparing the second list with said first list so that products on the first list but not on the second list are designated.

5. A method of detecting designated goods from a number of sources, which includes:

receiving at a central loss control station located at a second location a list of unique codes of designated products, the codes having been applied to the products at a first location;

recording said designated codes at the central loss control station;

receiving at the central loss control station codes of a multiplicity of products read at a third location;

comparing, at said central loss control station, said codes received from said third location with said recorded codes; and triggering an alarm at the central loss control station if any of the codes of the products at said third location match the codes of any of the designated products.

6. A method of detecting designated products from a number of sources, the method including the steps of applying a unique code to each one of a plurality of products at a first location and compiling a first list of codes;

reading the code of at least one of said plurality of products at a second location and compiling a second list of codes;

comparing said second list of codes to said first list of codes, said products having codes on said first list and not on said second list comprising said designated products;

transmitting said codes of said designated products to a central loss control station;

reading the codes of all products distributed at a third location and transmitting said codes to said central loss control station;

comparing said codes of all products at said third location to said codes of the designated products; and triggering an alarm at said central loss control station if any of the codes of the products at said third location match the codes of the designated products.

7. The method as claimed in claim 6, in which those products which become designated are determined by identifying those products which comprise products selected from the group consisting of products which are stolen, lost, not intended for resale, samples, intended for use by Government, and intended for export.

8. The method as claimed in claim 6, which includes transmitting data on the identity of the third location to the central loss control station.

9. The method as claimed in claim 8, which includes transmitting data to the central loss control station on the time at which the codes of the products at said third location are compared to the codes of the designated products.

10. The method as claimed in claim 9, which includes retaining a record of the data and the codes at the central loss control station of designated products that have been detected.

11. A system for detecting designated products from a number of sources, the system including:

an encoding means for applying a unique code to each one of a plurality of products at a first location;

a reading means for reading the code of at least one of said plurality of products at a second location;

a comparator for comparing the code of said at least one of said plurality of products at said second location to the codes of said plurality of products at said first location, said products having codes not found in both said first location and said second location comprising said designated products;

transmitting means for transmitting said codes of said designated products to a central loss control station;

a second reading means for reading the codes of all products at a third location;

transmitting means for transmitting said codes of all products at said third location to said central loss control station;

a second comparator for comparing the codes of the products at said third location to the codes of said designated products; and alarm means for providing an alarm when said codes of said products at said third location match the codes of the designated products.

12. The system as claimed in claim 11, in which the designated products are selected from the group of products comprising products which are stolen, lost, not intended for resale, samples, intended for use by Government, and intended for export.

13. The system as claimed in claim 11, in which the codes of the designated products are retained in a database at the central loss control station.

14. The system as claimed in claim 11, in which the transmitting means transmits data on the third location to the central loss control station.

15. The system as claimed in claim 11, in which the first location is a manufacturing plant, with the codes being applied to manufactured products on an assembly line.

16. The system as claimed in claim 11, in which the first location is a warehouse for imported products.

17. The system as claimed in claim 11, in which the first location is a warehouse for export products.

18. The system as claimed in claim 11, in which the third location is a retail outlet, with the reading means forming part of a bar code scanning system.

19. The system as claimed in claim 11, in which the third location is a retail outlet, with the reading means being in the form of a free-standing scanner.

* * * * *